(12) United States Patent
Teng et al.

(10) Patent No.: US 8,972,060 B2
(45) Date of Patent: Mar. 3, 2015

(54) CONTROL METHOD FOR CLEANING ROBOTS

(71) Applicant: Micro-Star International Company Limited, New Taipei (TW)

(72) Inventors: You-Wei Teng, New Taipei (TW); Shih-Che Hung, Hsinchu (TW); Yao-Shih Leng, Taipei (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 78 days.

(21) Appl. No.: 13/768,008

(22) Filed: Feb. 15, 2013

(65) Prior Publication Data

US 2013/0218341 A1    Aug. 22, 2013

Related U.S. Application Data

(60) Provisional application No. 61/599,690, filed on Feb. 16, 2012.

(30) Foreign Application Priority Data

Aug. 9, 2012 (TW) .............................. 101128716 A (51) Int. Cl.
*G06F 17/00* (2006.01)
*G05D 1/02* (2006.01)

(52) U.S. Cl.
CPC ............. *G05D 1/0234* (2013.01); *Y10S 901/01* (2013.01); *Y10S 901/47* (2013.01); *G05D 2201/0203* (2013.01)

USPC .................. 700/259; 700/245; 901/1; 901/47

(58) Field of Classification Search
CPC .................... G05D 1/0234; G05D 2201/0203; Y10S 901/01; Y10S 901/47
USPC ......................................... 700/259; 901/1, 47
See application file for complete search history.

(56) References Cited

U.S. PATENT DOCUMENTS

| | | | |
|---|---|---|---|
| 5,995,884 A * | 11/1999 | Allen et al. ...................... | 701/24 |
| 6,925,679 B2 * | 8/2005 | Wallach et al. ................. | 15/319 |
| 8,528,157 B2 * | 9/2013 | Schnittman et al. ............ | 15/319 |
| 8,706,297 B2 * | 4/2014 | Letsky .......................... | 700/245 |
| 8,742,926 B2 * | 6/2014 | Schnittman et al. .......... | 340/540 |
| 2002/0174506 A1 * | 11/2002 | Wallach et al. ................. | 15/319 |
| 2008/0047092 A1 * | 2/2008 | Schnittman et al. ............ | 15/319 |
| 2012/0169497 A1 * | 7/2012 | Schnittman et al. .......... | 340/540 |
| 2013/0298350 A1 * | 11/2013 | Schnittman et al. ............ | 15/319 |

* cited by examiner

*Primary Examiner* — McDieunel Marc (74) *Attorney, Agent, or Firm* — Birch, Stewart, Kolasch & Birch, LLP (57) ABSTRACT

An embodiment of the invention provides a control method of a cleaning robot with a non-omnidirectional light detector. The method includes the steps of: detecting a light beam via the non-omnidirectional light detector; stopping the cleaning robot and spinning the non-omnidirectional light detector when the non-omnidirectional light detector detects the light beam; stopping the spinning of the non-omnidirectional light detector and estimating a first spin angle when the non-omnidirectional light detector does not detect the light beam; and adjusting a moving direction of the cleaning robot according to the first spin angle.

20 Claims, 9 Drawing Sheets

CONTROL METHOD FOR CLEANING ROBOTS

CROSS REFERENCE TO RELATED APPLICATIONS

This application claims the benefit of U.S. Provisional Application No. 61/599,690 filed Feb. 19, 2012, the entirety of which is incorporated by reference herein.

This Application claims priority of Taiwan Patent Application No. 101128716, filed on Aug. 9, 2012, the entirety of which is incorporated by reference herein.

BACKGROUND OF THE INVENTION

1. Field of the Invention

The invention relates to a cleaning robot, and more particularly, to a cleaning robot with a non-omnidirectional light detector.

2. Description of the Related Art

A variety of movable robots, which generally include a driving means, a sensor and a travel controller, and perform many useful functions while autonomously operating, have been developed. For example, a cleaning robot for the home, is a cleaning device that sucks dust and dirt from the floor of a room while autonomously moving around the room without user manipulation.

BRIEF SUMMARY OF THE INVENTION

An embodiment of the invention provides a control method of a cleaning robot with a non-omnidirectional light detector. The method comprises the steps of: detecting a light beam via the non-omnidirectional light detector; stopping the cleaning robot and spinning the non-omnidirectional light detector when the non-omnidirectional light detector detects the light beam; stopping the spinning of the non-omnidirectional light detector and estimating a first spin angle when the non-omnidirectional light detector does not detect the light beam; and adjusting a moving direction of the cleaning robot according to the first spin angle.

Another embodiment of the invention provides a control method for a cleaning robot with a non-omnidirectional light detector. The method comprises the steps of: detecting a light beam via the non-omnidirectional light detector; when the non-omnidirectional light detector detects a light beam at a first time, continuing the movement of the cleaning robot; stopping the cleaning robot and spinning the non-omnidirectional light detector when the non-omnidirectional light detector does not detect the light beam; stopping the spinning of the non-omnidirectional light detector and estimating a first spin angle when the non-omnidirectional light detector detects the light beam again; and adjusting a moving direction of the cleaning robot according to the first spin angle.

Another embodiment of the invention provides a cleaning robot. The cleaning robot comprises a wireless signal detector, a motor and a controller. The wireless signal detector detects a first wireless signal. The motor moves the cleaning robot. The controller controls the motor according to the first wireless signal, wherein when the wireless signal detector detects the first wireless signal and a strength of the first wireless signal is greater than a predetermined value, the controller determines whether the first wireless signal is output by a light generating device. When the first wireless signal is output by a light generating device, the controller controls the wireless signal detector and the motor to let the cleaning robot move to the light generating device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2b is a flat view of the non-omnidirectional light detector of FIG. 2a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
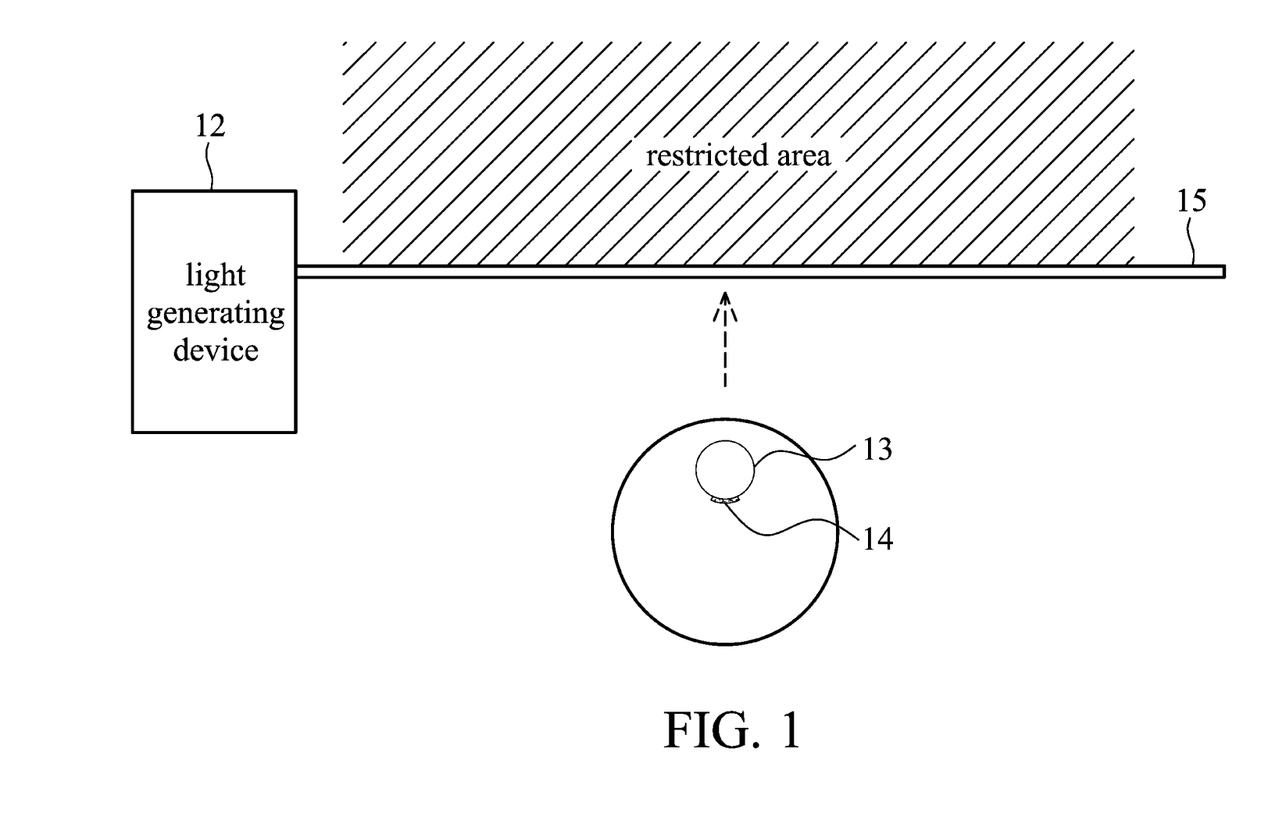
FIG. 1 is a schematic diagram of a light generating device and a cleaning robot according to an embodiment of the invention.

FIG. 1 is a schematic diagram of a light generating device and a cleaning robot according to an embodiment of the invention. The light generating device 12 outputs a light beam 15 to label a restricted area that the cleaning robot 11 cannot enter. The cleaning robot 11 comprises a non-omnidirectional light detector 13 having a rib (or called mask) 14, where the rib 14 produces a shadowed area on the non-omnidirectional light detector 13 by a predetermined angle and the range of the predetermined angle is from 30 degrees to 90 degrees.

The rib 14 may be fixed on the surface of the non-omnidirectional light detector 13 or movable along the non-omnidirectional light detector 13. The rib 14 can be spun in 360 degrees along the surface of the non-omnidirectional light detector 13. In this embodiment, the term, non-omni, is a functional description to describe that the rib 14 causes an area on the surface of the non-omnidirectional light detector 13 and the non-omnidirectional light detector 13 cannot not detect light therein or light to not directly reach that area.

Thus, the non-omnidirectional light detector 13 can be implemented in two ways. The first implementation is to combine an omni-light detector with a rib 14 and the rib 14 is fixed on a specific position of the surface of the omni-light detector. The non-omnidirectional light detector 13 is disposed on a plate that can be spun by a motor. Thus, the purpose of spinning of the non-omnidirectional light detector 13 can be achieved. When the non-omnidirectional light detector 13 detects the light beam, an incident angle of the light beam 15 can be determined by spinning the non-omnidirectional light detector 13.

Another implementation of the non-omnidirectional light detector 13 is implemented by telescoping a mask kit on an omni-light detector, wherein the omni light detector cannot be spun and the masking kit is movable along a predetermined track around the omni light detector. The mask kit is spun by a motor. When the non-omnidirectional light detector 13 detects the light beam 15, the mask kit is spun to determine the incident angle of the light beam 15.

Reference can be made to FIGS. 2a to 2e for the detailed description of the non-omnidirectional light detector 13.

Figure 2A:
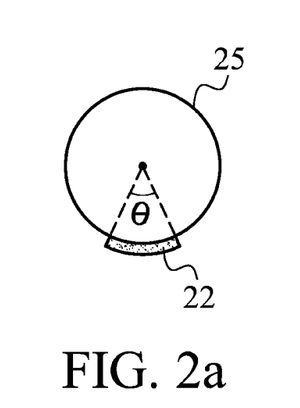
FIG. 2a is a top view of an embodiment of a non-omnidirectional light detector according to the invention.

FIG. 2a is a top view of an embodiment of a non-omnidirectional light detector according to the invention. The mask 22 is formed by an opaque material and is adhered to a part of sensing area of an omni light detector 21. The mask 22 forms a sensing dead zone with an angle θ on the omni light detector 21.

Figure 2B:
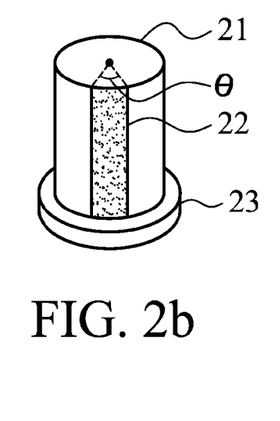

Please refer to FIG. 2b. FIG. 2b is a flat view of the non-omnidirectional light detector of FIG. 2a. In FIG. 2b, the omni light detector 21 is fixed on a base 23. The base 23 can be driven and spun by a motor or a step motor. A controller of the cleaning robot outputs a control signal to spin the base 23. Although the typical type of omni light detector 21 can receive light from any direction, the omni light detector 21 cannot determined the direction that the light comes from and the cleaning robot cannot know the position of a light generating device or charging station. With the help of the mask 22, the light direction can be determined.

When the omni light detector 21 detects a light beam, the base 23 is set to be spun for 360 degrees in a clockwise direction or a counter clockwise direction. When the omni light detector 21 cannot detect the light beam, a controller of the cleaning robot calculates a spin angle of the base 23, wherein the spin angle ranges from 0 degree to (360-θ) degrees. The controller then determines the direction of the light beam according to a spin direction of the base 23, the spin angle and the angle θ. Reference can be made to the descriptions related to FIG. 2c and FIG. 2d a more detailed description for estimating an incident angle of a light beam.

Figure 2C:
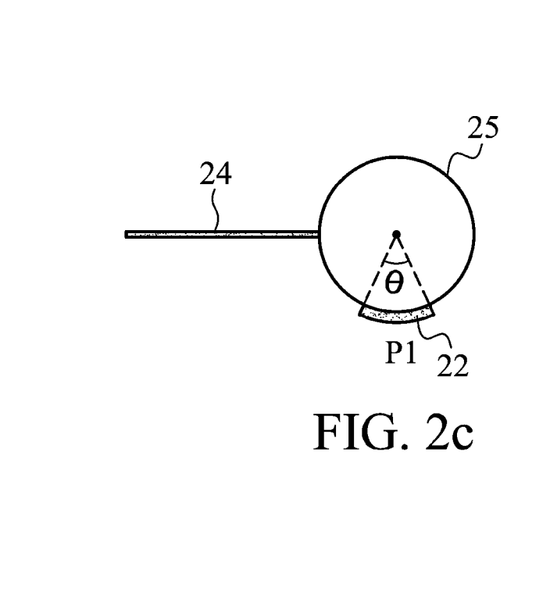
FIGS. 2c and 2d are schematic diagrams for estimating an incident angle of a light beam by using the proposed non-omnidirectional light detector according to the invention.
Figure 2D:
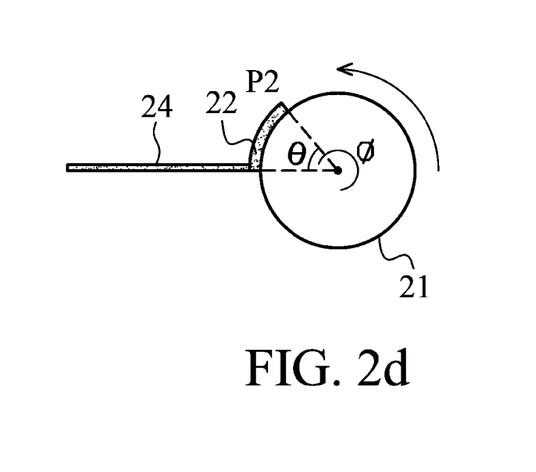

FIGS. 2c and 2d are schematic diagrams for estimating an incident angle of a light beam by using the proposed non-omnidirectional light detector according to the invention. In FIG. 2c, the initial position of the mask 22 is at P1. When the non-omnidirectional light detector 25 detects a light beam 24, the non-omnidirectional light detector 25 is spun in a predetermined direction. In this embodiment, the predetermined direction is a counter clockwise direction. In FIG. 2d, when the non-omnidirectional light detector 25 does not detect the light beam 24, the non-omnidirectional light detector 25 stops spinning. The controller of the cleaning robot determines a spin angle Φ of the non-omnidirectional light detector 25 and estimates the direction of the light beam 24 according to the spin angle Φ and the initial position P1.

In another embodiment, the non-omnidirectional light detector 25 is driven by a motor, and the motor transmits a spin signal to the controller for estimating the spin angle Φ. In another embodiment, the non-omnidirectional light detector 25 is driven by a step motor. The step motor is spun according to numbers of received impulse signals. The controller therefore estimates the spin angle Φ according to the number of impulse signals and a step angle of the step motor.

In another embodiment, the non-omnidirectional light detector 25 is fixed on a base device with a gear disposed under the base device, wherein meshes of the gear are driven by the motor. In another embodiment, the non-omnidirectional light detector 25 is driven by the motor via a timing belt.

Figure 2E:
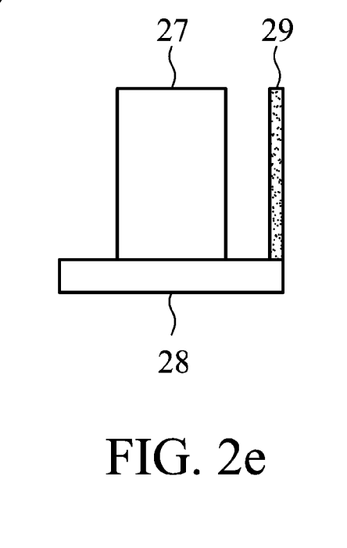
FIG. 2e is a schematic diagram of another embodiment of a non-omnidirectional light detector according to the invention.

FIG. 2e is a schematic diagram of another embodiment of a non-omnidirectional light detector according to the invention. The non-omnidirectional light detector 26 comprises an omni light detector 27, a base 28 and a vertical extension part 29 formed on the base 28. The vertical extension part 29 is formed by an opaque material and forms a dead zone area on the surface of the omni light detector 27. When the light beam is toward to the dead zone area, the omni light detector 27 cannot detect the light beam. The base 28 is spun by a motor to detect a light direction. The omni light detector 27 is not physically connected to the base 28 and the omni light detector 27 is not spun when the base is spun by the motor. Reference can be made to the descriptions related to FIGS. 2c and 2d for the light direction detection operation of the non-omnidirectional light detector 26.

Figure 3:
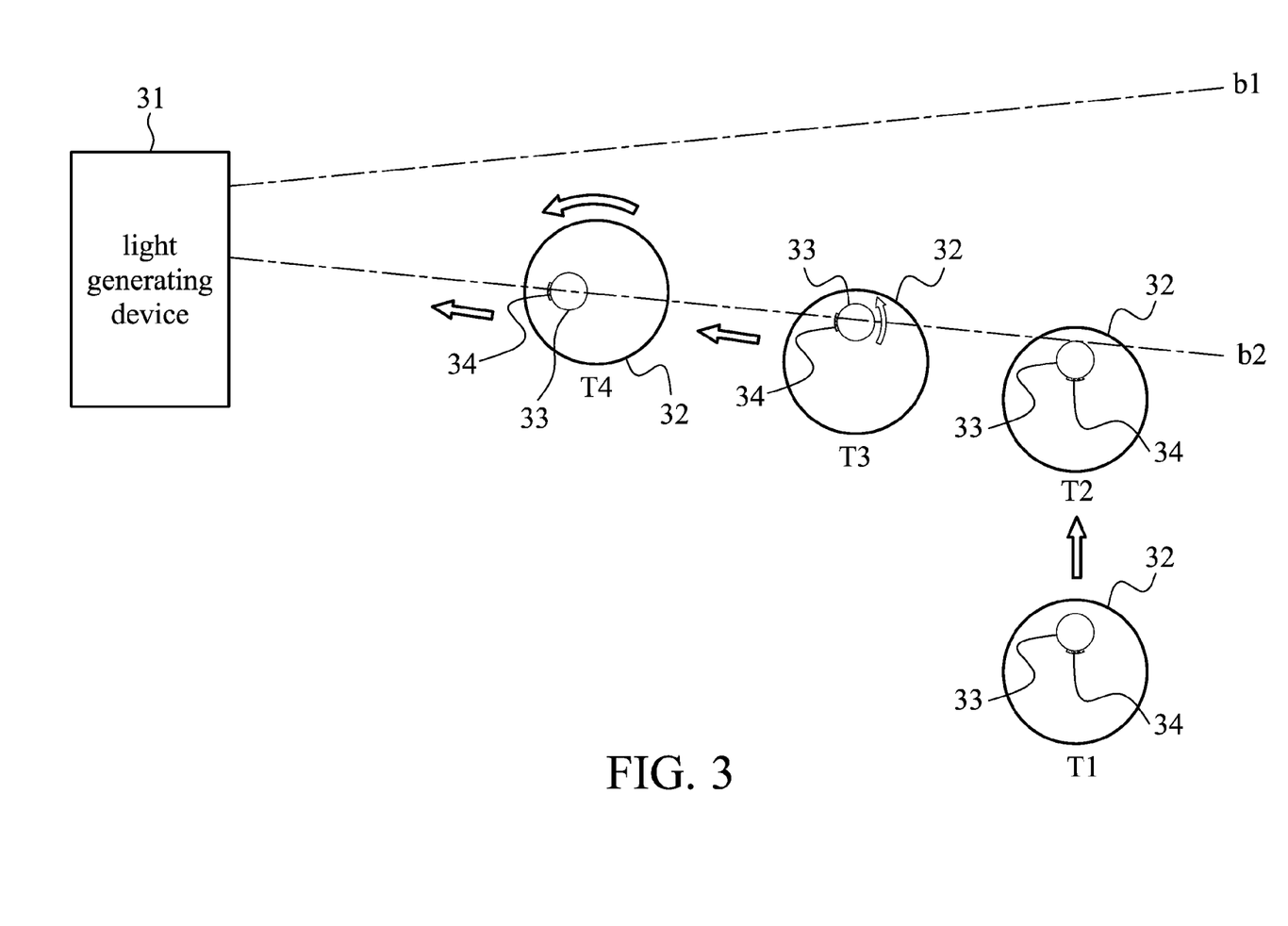
FIG. 3 is a schematic diagram of a control method for a cleaning robot according to an embodiment of the invention.

FIG. 3 is a schematic diagram of a control method for a cleaning robot according to an embodiment of the invention. The light generating device 31 outputs a light beam to label a restricted area that the cleaning robot 32 cannot enter. In other embodiments, the light generating device 31 is named as light house or light tower and outputs the light beam or other wireless signals. The light beam comprises a first boundary b1 and a second boundary b2. At time T1, the cleaning robot 32 moves along a predetermined route. At time T2, the non-omnidirectional light detector 33 detects a first boundary b2 of a light beam emitted by the light generating device 31. The cleaning robot 32 therefore stops moving and the non-omnidirectional light detector 33 is then spun in a counter clockwise direction or a clockwise direction.

At time T3, the mask 34 blocks the light beam emitted from the light generating device 31 and the non-omnidirectional light detector 33, therefore the non-omnidirectional light detector 33 does not detect the light beam. A controller of the cleaning robot 32 stores a current position of the mask 32 and estimates a first spin angle of the non-omnidirectional light detector 33 according to an initial position of the mask 32 and the current position of the mask 32.

If the cleaning robot 32 adjusts its moving direction directly according to the first spin angle, the cleaning robot 32 may not move straightforward to the light generating device 31. A calibration mechanism for calibrating the moving direction of the cleaning robot 32 according to the spin angle of the non-omnidirectional light detector 33 is necessary.

In this embodiment, the calibration mechanism estimates a second spin angle according to the first spin angle, a first center of the non-omnidirectional light detector 33, a second center of the cleaning robot 32 and a distance between the first center and the second center. Then, the cleaning robot 32 is spun according to the second spin angle. By this way, it can be sure that the cleaning robot 32 moves straightforward to the light generating device 31 along the light beam.

In another embodiment, the controller of the cleaning robot 32 acquires a first coordinate of the first center and a second coordinate of the second center to estimate a relative angle between the first center and the second center. Then, the controller estimates the second spin angle according to the first spin angle and the relative angle. The cleaning robot 32 then spins for the second spin angle. After spinning, the front of the cleaning robot 32 opposes to the light generating device 31. When the cleaning robot 32 moves straightforward, the cleaning robot 32 is therefore approaching to the light generating device and does not need to calibrate the moving direction during the movement.

In this embodiment, only the non-omnidirectional light detector 33 is spun at time T3. When the direction of the detected light beam is determined, the cleaning robot 32 is spun at time T4. In another embodiment, when the non-omnidirectional light detector 33 is spun at time T3, the cleaning robot 32 is also spun. When the non-omnidirectional light detector 33 does not detect the light beam, the non-omnidirectional light detector 33 and the cleaning robot 32 stops spinning. When the cleaning robot 32 stops spinning, the cleaning robot 32 moves straightforward.

It is noted that the cleaning robot 32 stays at the same position at times T3 and T4. At time T3, the cleaning robot 32 is not moved or spun and only the non-omnidirectional light detector 33 is spun. At time T4, the cleaning robot 32 is spun in a circle at the original position. Although the position of the cleaning robot 32 at time T3 is different from the position of the cleaning robot 32 at time T4 in FIG. 3, it represents only two operations at the same position but at different times. In fact, the position of the cleaning robot 32 does not change at time T3 and T4.

When the direction of the light beam is determined by the controller of the cleaning robot 32, the controller draws the light beam on a map and marks a restricted area on the map according to the light beam. The map may be stored in a memory or a map database of the cleaning robot 32. The controller of the cleaning robot 32 modifies the map and labels the obstacles on the map according to each movement of the cleaning robot 32.

At time T4, the mask 34 is in front of the non-omnidirectional light detector 33 and the non-omnidirectional light detector 33 cannot detect the light beam because the mask 34 blocks the light beam. Thus, the cleaning robot 32 substantially moves straightforward to the light generating device 31 when the cleaning robot 32 is moving and the non-omnidirectional light detector 33 does not detect the light beam.

When the cleaning robot 32 moves to the light generating device 31 and the non-omnidirectional light detector 33 detects the light beam emitted from the light generating device 31, the cleaning robot 32 stops and calibrates the moving direction of the cleaning robot according to the detection result of the non-omnidirectional light detector 33.

When the cleaning robot 32 approaches to the light generating device 31 and the distance between the cleaning robot 32 and the light generating device 31 is less than a predetermined distance, a touch sensor outputs a stop signal to the controller of the cleaning robot 32. The touch sensor is disposed in the front end of the cleaning robot 32 to detect whether there is any obstacle in front of the cleaning robot 32. When the touch sensor detects an obstacle, the cleaning robot 32 first determines whether the obstacle is the light generating device 31. If the obstacle is the light generating device 31, the cleaning robot 32 stops moving and moves in another direction. If the obstacle is not the light generating device 31, the cleaning robot 32 first leaves the original route to avoid the obstacle and returns to the original route after avoiding the obstacle.

When the cleaning robot 32 approaches to the light generating device 31, the light generating device 31 outputs a radio frequency (RF) signal or an infrared signal to let the cleaning robot 32 know that the cleaning robot 32 is close to the light generating device 31. In another embodiment, Near Field Communication (NFC) devices are embedded in both the cleaning robot 32 and the light generating device 31. When the NFC device of the cleaning robot 32 receives signals or data from the NFC device of the light generating device 31, it means that the cleaning robot 32 is close to the light generating device 32 and the cleaning robot 43 should stop accordingly. Generally speaking, the sensing distance of the NFC device is 20 cm.

In this embodiment, the light beam emitted by the light generating device 31 comprises a modulated signal or encoded signal. Therefore, when the non-omnidirectional light detector 33 detects the light beam, the controller of the cleaning robot 32 first demodulates or decodes the received light beam to determine whether the light beam is emitted by the light generating device 31. Only when the light beam is emitted by the light generating device 31, will the described operations be executed.

In another embodiment, the cleaning robot 32 further comprises a reflection device. The reflection device is disposed on the non-omnidirectional light detector 33. In another embodiment, the reflection device is disposed on the mask 32. The light generating device 31 further comprises a receiver to receive the light beam from the cleaning robot. In one embodiment, the receiver receives a reflection light beam reflected by the reflection device of the cleaning robot 32. A control device of the light generating device 31 then decodes or demodulates the reflection light beam. When the control device determines that the reflection light beam and the light beam from the light generating device 31 have the same coding format or modulation format, the control device determines that the cleaning robot 32 is close to the light generating device 31. The light generating device 31 can output a light beam with different modulations or encoding formats and the cleaning robot 32 then executes a corresponding operation, function or action according the received light beam.

In one embodiment, the cleaning robot 32 comprises a first wireless device to establish a wireless connection to the light generating device 31. The light generating device 31 comprises a second wireless device to establish the wireless connection to the cleaning robot 32 or connects to the internet. When the light generating device 31 receives the light beam from the cleaning robot 32, the light generating device 31 automatically connects to the internet or establishes a wireless connection to the cleaning robot 32 automatically. In another embodiment, only after the light generating device 31 establishes the wireless connection to the cleaning robot 32, the light generating device 31 connects to the internet.

According to the above description, the cleaning robot 32 can clean the areas near the light beam output by the light generating device 31 and the cleaning robot 32 will not enter a restricted area. Furthermore, the controller of the cleaning robot 32 can draw a map of the cleaning area. When the cleaning robot 32 cleans the same area again, the cleaning robot 32 can move according to the map of the cleaning area to complete the cleaning job efficiently and quickly.

Figure 4:
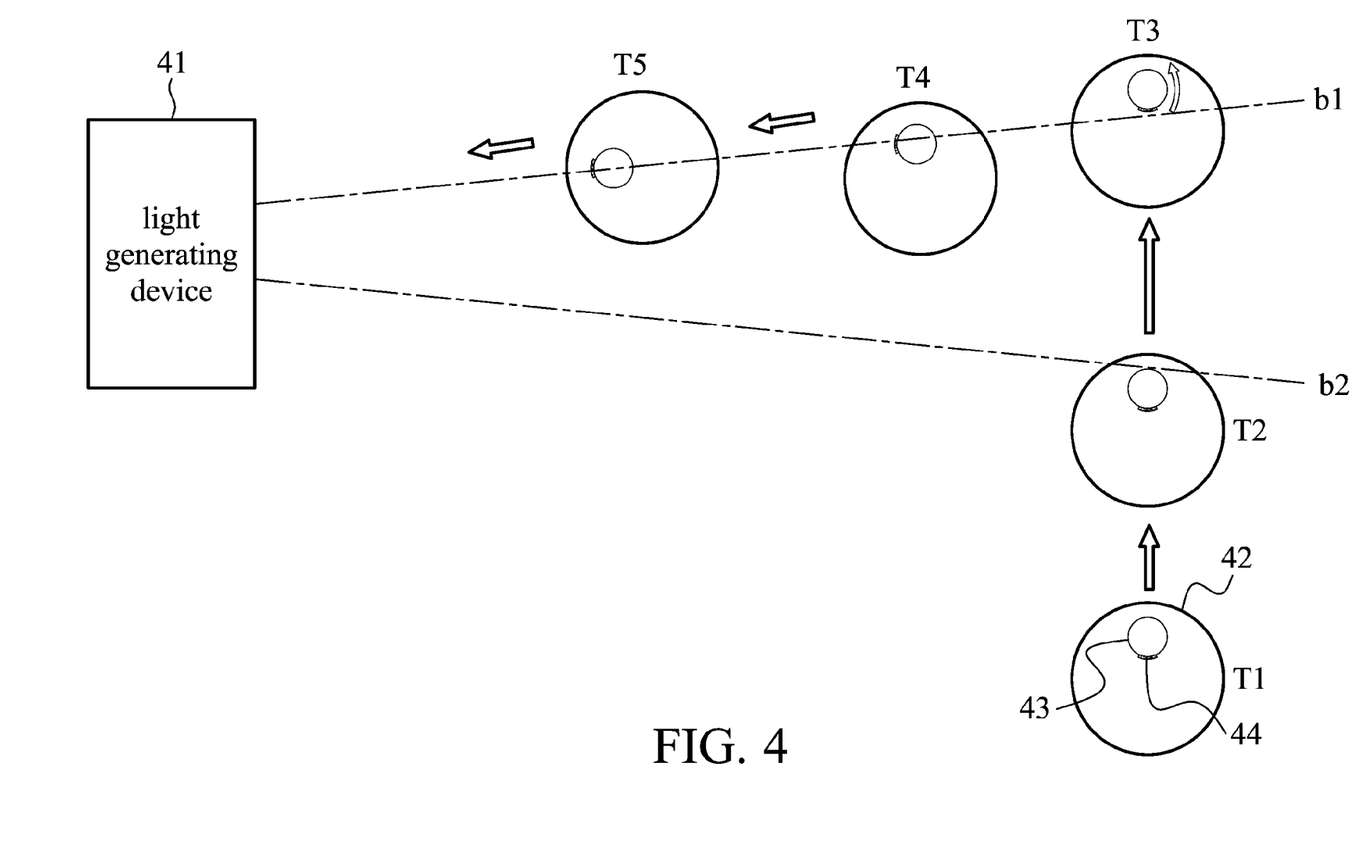
FIG. 4 is a schematic diagram of a control method for a cleaning robot according to another embodiment of the invention.

FIG. 4 is a schematic diagram of a control method for a cleaning robot according to another embodiment of the invention. The light generating device 41 outputs a light beam to label a restricted area that the cleaning robot 42 cannot enter. In other embodiments, the light generating device 41 is named as light house or light tower and outputs the light beam or other wireless signal. The light beam comprises a first boundary b1 and a second boundary b2. At time T1, the cleaning robot 42 moves along a predetermined route. At time T2, the non-omnidirectional light detector 43 detects a first boundary b2 of a light beam emitted by the light generating device 41 and the cleaning robot 42 keeps moving along the predetermined route. At time T3, the non-omnidirectional light detector 43 cannot detect the light beam and the cleaning robot 42 stops moving. The non-omnidirectional light detector 43 is then spun in a counter clockwise direction or a clockwise direction.

When the non-omnidirectional light detector 43 detects the light beam from the light generating device 41, a controller of the cleaning robot 42 receives a first trigger signal and the controller knows that the cleaning robot 42 is close to the restricted area. The controller then executes some functions of the cleaning robot 42. For example, the controller may slow the cleaning robot 42 down or pre-activate a direction detection procedure for the detected light beam. In this embodiment, the phrase "pre-activate" means that the controller starts collecting parameters or data required by the direction detection procedure.

When the non-omnidirectional light detector 43 cannot detect the light beam from the light generating device 41, the controller of the cleaning robot 42 receives a second trigger signal. The controller stops the cleaning robot 42 in response to the second trigger signal. If the direction detection procedure is activated when the controller receives the first trigger signal, the direction detection procedure immediately starts estimating the direction of the light beam emitted by the light generating device 41 when receiving the second trigger signal.

At time T4, the mask 44 blocks the light beam emitted from the light generating device 41 and the non-omnidirectional light detector 43, therefore, the non-omnidirectional light detector 43 does not detect the light beam. The controller of the cleaning robot 42 stores a current position of the mask 42 and estimates a first spin angle of the non-omnidirectional light detector 43 according to an initial position of the mask 42 and the current position of the mask 42.

If the cleaning robot 42 adjusts its moving direction directly according to the first spin angle, the cleaning robot 42 may not move straightforward to the light generating device 41. A calibration mechanism for calibrating the moving direction of the cleaning robot 42 according to the spin angle of the non-omnidirectional light detector 43 is necessary.

In this embodiment, the calibration mechanism estimates a second spin angle according to the first spin angle, a first center of the non-omnidirectional light detector 43, a second center of the cleaning robot 42 and a distance between the first center and the second center. Then, the cleaning robot 42 is spun according to the second spin angle. By this way, it can be sure that the cleaning robot 42 moves straightforward to the light generating device 41 along the light beam.

In another embodiment, the controller of the cleaning robot 42 acquires a first coordinate of the first center and a second coordinate of the second center to estimate a relative angle between the first center and the second center. Then, the controller estimates the second spin angle according to the first spin angle and the relative angle. The cleaning robot 42 then spins for the second spin angle. After spinning, the front end of the cleaning robot 42 is toward to the light generating device 41. Thus, when the cleaning robot 42 moves straightforward, the cleaning robot 42 is therefore approaching to the light generating device and the cleaning robot 42 does not need to calibrate the moving direction during the movement.

It is noted that the cleaning robot 42 does not move at time T3 and time T4. At time T3, only the non-omnidirectional light detector 43 is spun at time T3. At time T4, the cleaning robot 42 is spun in a circle at the same position. Although the position of the cleaning robot 42 at time T3 is different from the position of the cleaning robot 42 at time T4 in FIG. 4, it represents only two operations at the same position but at different times. In fact, the position of the cleaning robot 42 does not change at time T3 and time T4

When the direction of the light beam is determined by the controller of the cleaning robot 42, the controller draws the light beam on a map and marks a restricted area on the map according to the light beam. The map may be stored in a memory or a map database of the cleaning robot 42. The controller of the cleaning robot 42 modifies the map and labels the obstacles on the map according to the movements of the cleaning robot 42.

At time T4 and time T5, the mask 44 is at the front of the non-omnidirectional light detector 43 and the non-omnidirectional light detector 43 cannot detect the light beam because the mask 44 blocks the light beam. Thus, the cleaning robot 42 substantially moves straightforward to the light generating device 41 when the cleaning robot 42 is moving and the non-omnidirectional light detector 43 does not detect the light beam.

When the cleaning robot 42 is moving to the light generating device 41 and the non-omnidirectional light detector 43 detects the light beam emitted from the light generating device 41, the cleaning robot 42 stops and calibrates the moving direction of the cleaning robot 42 according to the detection result of the non-omnidirectional light detector 43.

When the cleaning robot 42 approaches to the light generating device 41 and the distance between the cleaning robot 42 and the light generating device 41 is less than a predetermined distance, a touch sensor outputs a stop signal to the controller of the cleaning robot 42. The touch sensor is disposed in the front end of the cleaning robot 42 to detect whether there is any obstacle in front of the cleaning robot 42. When the touch sensor detects an obstacle, the cleaning robot 42 first determines whether the obstacle is the light generating device 41. If the obstacle is the light generating device 41, the cleaning robot 42 stops moving and moves in another direction. If the obstacle is not the light generating device 41, the cleaning robot 42 first leaves the original route to avoid the obstacle and returns to the original route after avoiding the obstacle.

When the cleaning robot 42 approaches to the light generating device 41, the light generating device 41 outputs a radio frequency (RF) signal or an infrared signal to let the cleaning robot 42 know that the cleaning robot 42 is close to the light generating device 41. In another embodiment, Near Field Communication (NFC) devices are embedded in both the cleaning robot 42 and the light generating device 41. When the NFC device of the cleaning robot 42 receives signals or data from the NFC device of the light generating device 41, it means that the cleaning robot 42 is close to the light generating device 42 and the cleaning robot 43 should stop accordingly. Generally speaking, the sensing distance of the NFC device is 20 cm.

Figure 5:
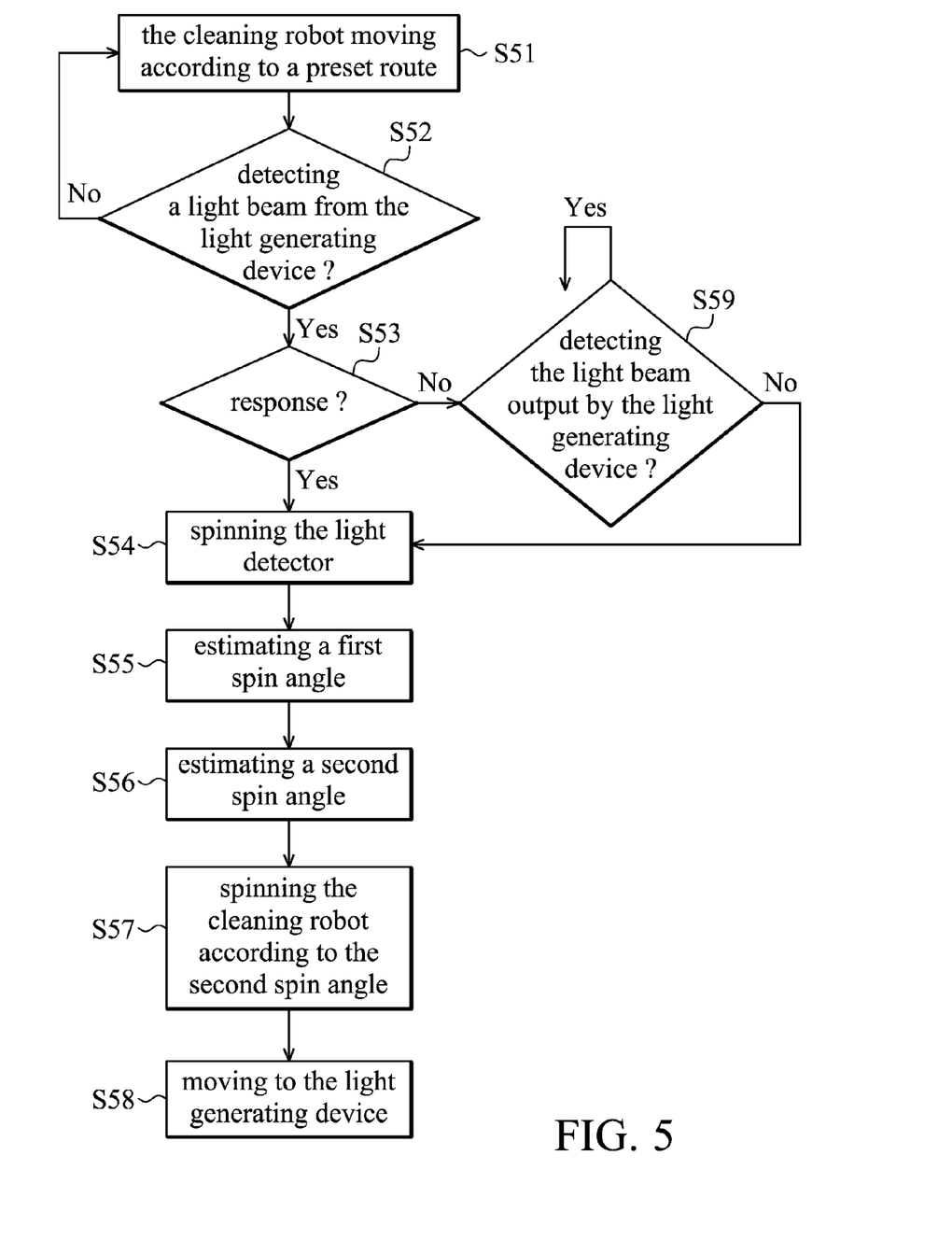
FIG. 5 is a flowchart of a control method of the cleaning robot according to another embodiment of the invention.

FIG. 5 is a flowchart of a control method of the cleaning robot according to another embodiment of the invention. In step S51, the cleaning robot moves according to a preset route. Typically, the cleaning robot moves in a random mode or an initial moving mode set by the user when the cleaning robot starts working. When the cleaning robot moves in the random mode, a controller of the cleaning robot starts drawing an indoor plane map. Next time when the cleaning robot executes a cleaning job, the cleaning robot moves according to the indoor plane map to increase efficiency.

In step S52, a light detector determines whether a light beam from the light generating device is detected. If not, the cleaning robot moves according to the original route. If the light detector detects the light beam from the light generating device, step S53 is then executed. In this embodiment, the light detector is a non-omnidirectional light detector. The light beam emitted by the light generating device carries encoded information or modulated information. When the light detector detects the light beam, the detected beam is decoded or demodulated to confirm whether the light beam is emitted by the light generating device.

In step S53, the controller of the cleaning robot determines whether to respond to the event that the light detector detects by the light beam outputted by the light generating device. For example, the cleaning robot leaves the area covered by the light beam. If the controller decides to respond, step S54 is executed. If the controller decides not to respond, step S59 is executed and the cleaning robot keeps moving.

In step S59, the controller of the cleaning robot continuous to determine whether the light detector of the cleaning robot is still detecting the light beam output by the light generating device. If yes, the cleaning robot keeps moving and the step S59 is still executed. When the light detector of the cleaning robot does not detect the light beam output by the light generating device, step S54 is executed. In the step S59, the situation where the light detector of the cleaning robot does not detect the light beam output by the light generating device represents that the cleaning robot may enter the restricted area and the cleaning robot has to leave as soon as possible.

In the step S53, when the light detector detects the light beam output by the light generating device, the light detector transmits a first trigger signal to the controller and the controller determines to execute the step S54 or step S59 according to the setting of the cleaning robot and the first trigger signal. In one embodiment, the first trigger signal is transmitted to a GPIO (general purpose input/output pin) and the logic state of the GPIO pin is changed accordingly. For example, assuming the first trigger signal is a rising edge-triggered signal and the default logic state of the GPIO pin is a logic low state, the logic state of the GPIO pin is changed to a logic high state when receiving the rising edge-triggered signal. The change of the logic state of the GPIO pin triggers an interrupt event and the controller of the cleaning robot knows that the light detector has detected the light beam output from the virtual according to the interrupt event.

In step S54, the cleaning robot stops moving and the light detector is spun in a clockwise direction or a counter clockwise direction. Reference can be made to the descriptions related to FIGS. 2a-2e for detailed description of the structure and the operation of the light detector. In step S55, when the light detector does not detect the light beam from the light generating device, the controller of the cleaning robot estimates a first spin angle.

Then, in step S56, the controller of the cleaning robot estimates a second spin angle according to the first spin angle, a first center of the light detector, a second center of the cleaning robot and a distance between the first center and the second center. Then, the cleaning robot is spun according to the second spin angle (step S57). By this way, it can be sure that the cleaning robot moves straightforward to the light generating device.

In another embodiment, the controller of the cleaning robot acquires a first coordinate of the first center and a second coordinate of the second center to estimate a relative angle between the first center and the second center. Then, the controller estimates the second spin angle according to the first spin angle and the relative angle. The cleaning robot then spins for the second spin angle. After spinning, the front of the cleaning robot opposes to the light generating device. When the cleaning robot moves straightforward, the cleaning robot is therefore approaching to the light generating device and does not need to calibrate the moving direction during the movement.

In step S58, the cleaning robot moves to the light generating device. When the cleaning robot moves to the light generating device, the cleaning robot stops and calibrates the moving direction of the cleaning robot according to the detection result of the light detector when the light detector detects the light beam output from the light generating device.

When the cleaning robot approaches to the light generating device and the distance between the cleaning robot and the light generating device is less than a predetermined distance, a touch sensor outputs a stop signal to the controller of the cleaning robot. The touch sensor is disposed in the front end of the cleaning robot to detect whether there is any obstacle in front of the cleaning robot. When the touch sensor detects an obstacle, the cleaning robot first determines whether the obstacle is the light generating device. If the obstacle is the light generating device, the cleaning robot stops moving and moves in another direction. If the obstacle is not the light generating device, the cleaning robot first leaves the original route to avoid the obstacle and returns to the original route after avoiding the obstacle.

When the cleaning robot approaches to the light generating device, the light generating device outputs a radio frequency (RF) signal or an infrared signal to let the cleaning robot 32 know that the cleaning robot is near to the light generating device. In another embodiment, Near Field Communication (NFC) devices are embedded in both the cleaning robot and the light generating device. When the NFC device of the cleaning robot receives signals or data from the NFC device of the light generating device, it means that the cleaning robot is very close to the light generating device and the cleaning robot should stop accordingly. Generally speaking, the sensing distance of the NFC device is 20 cm.

Figure 6:
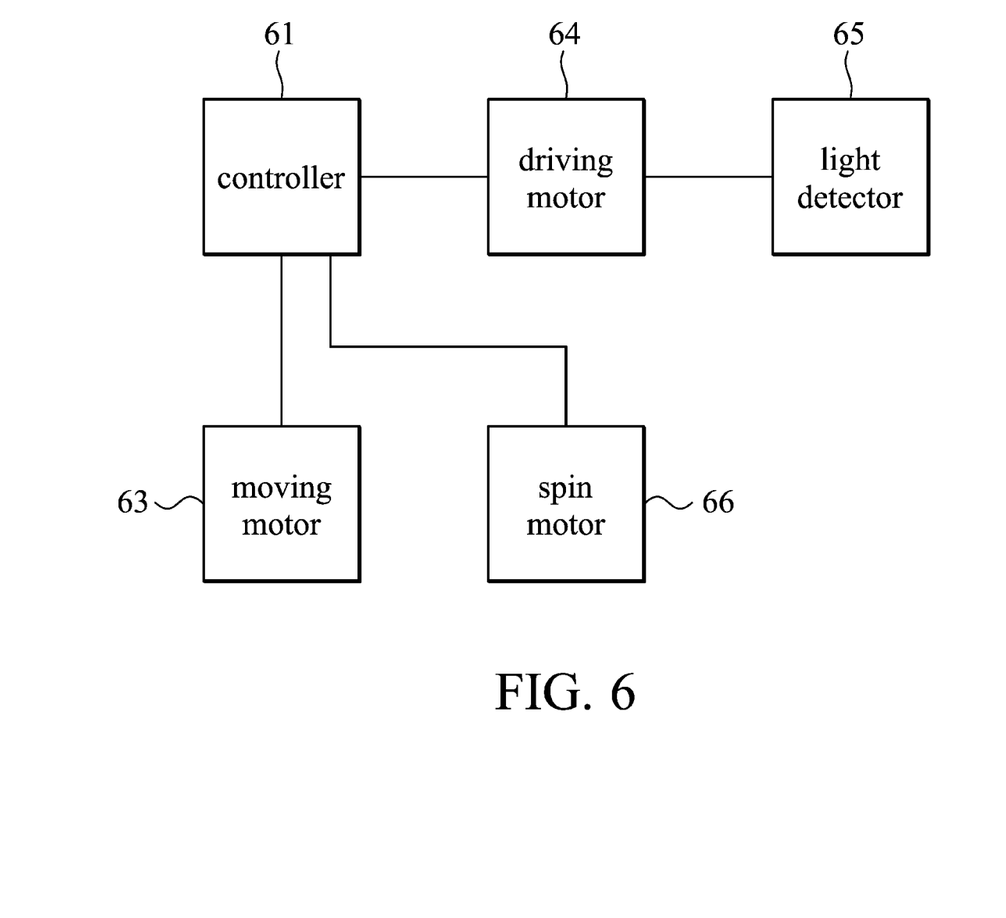
FIG. 6 is a schematic diagram of an embodiment of a cleaning robot according to the invention.

FIG. 6 is a schematic diagram of an embodiment of a cleaning robot according to the invention. The light detector 65 is spun by a driving motor 64. The structure and the operation of the light detector 65 can be Reference can be made to the descriptions related to FIGS. 2a-2e for detailed description of the structure and the operation of the light detector 65. The moving motor 63 controls the cleaning robot to move forward or backward. The spin motor 66 spins the cleaning robot to control the forward-moving direction or the backward-moving direction of the cleaning robot.

The main controller 61 executes a program to control the cleaning robot. The program comprises sub-routines and one of the sub-routines is about what the cleaning robot has to do when the cleaning robot encounters the light generating device. Reference can be made to the descriptions related to FIGS. 3-5 for the function or the operation of the sub-routine.

The embodiment illustrates with the light detector 65, but the invention is not limited thereto. The light detector 65 can be replaced by an acoustic signal detector. The acoustic signal detector can be spun and determines the position of the light generating device according to the strength of the received acoustic signal. For example, when the acoustic signal detector detects a maximum strength of the acoustic signal, it means that the acoustic signal detector is opposite to the light generating device. In this embodiment, the acoustic signal detector is an acoustic panel.

Figure 7:
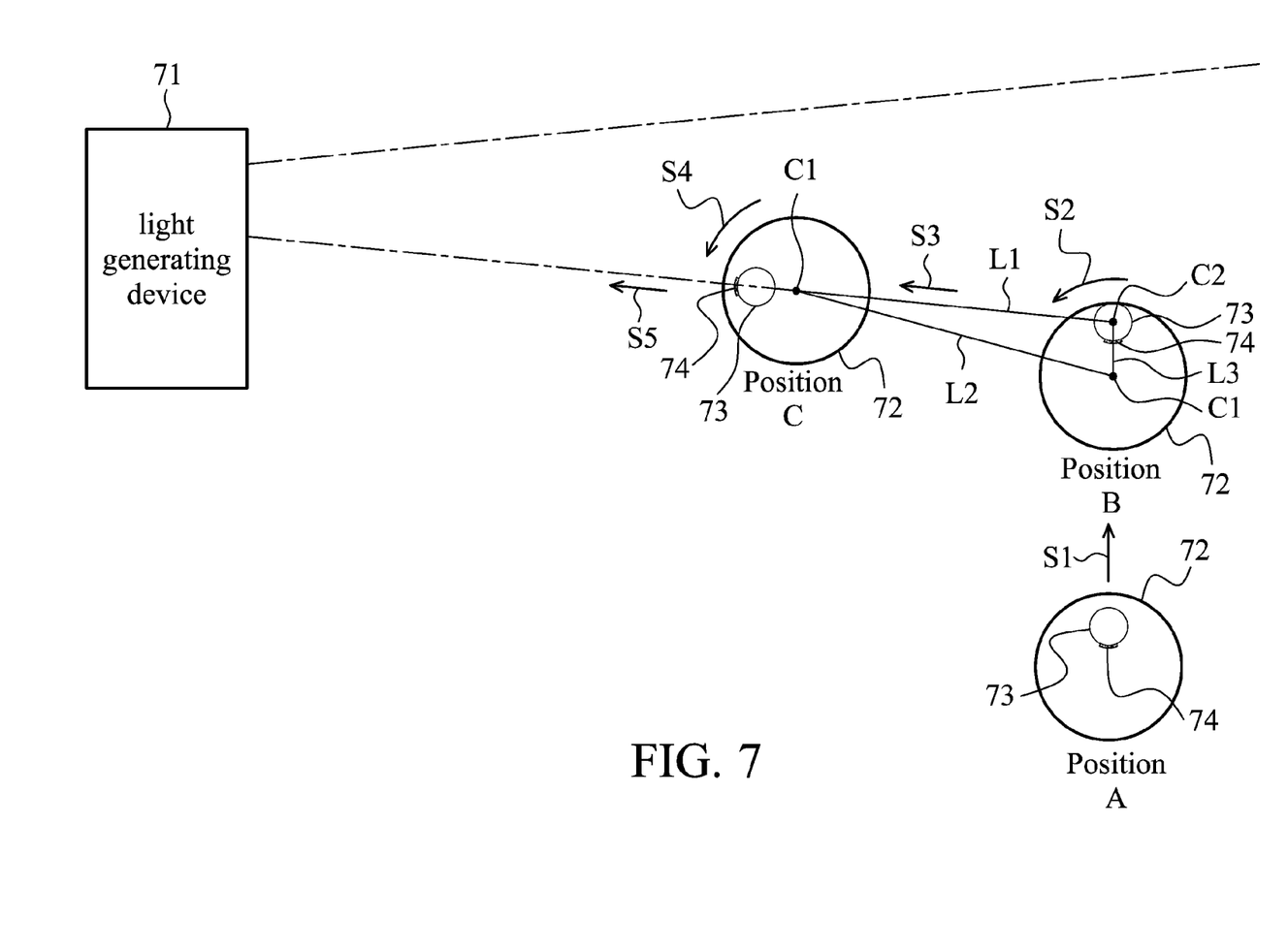
FIG. 7 is a schematic diagram of a control method of a cleaning robot according to another embodiment of the invention.

FIG. 7 is a schematic diagram of a control method of a cleaning robot according to another embodiment of the invention.

At the position A, the cleaning robot 72 moves according to a predetermined route, and the rib 74 is fixed at the back of the light detector 73.

Position A to Position B

Step S1:

The light detector 73 detects the light beam from the light generating device 71 and the cleaning robot 72 stops moving at position B.

Position B to Position C

Step S2:

The light detector 73 is spun in a clockwise direction or a counter-clockwise direction and stops spinning when the light detector 73 cannot detect the light beam from the light generating device. A controller of the cleaning robot estimates a first spin angle of the light detector 73. Assuming a distance between a first center C of the light detector 73 and a second center C1 of the cleaning robot 72 is 15 cm, and the length of the line L1 is 50 cm. The controller estimates the slope rate of the line L1 according to the first spin angle. Since a first coordinate of the first center C1 is known at position B and the length of the line L2 is fixed, a second coordinate of the second center C1 of the cleaning robot 72 at position C can be therefore acquired. The slope rate of line L2 can be estimated according to the first coordinate and the second coordinate. An included angle between the lines L2 and L3 is the spin angle that the cleaning robot 72 should be spun.

Step S3:

The cleaning robot 72 moves from position B to position C. In this embodiment, the cleaning robot 72 moves along the line L1 for a fixed distance.

Position C to Light Generating Device 71

Step S4:

The controller calculates an included angle between lines L1 and L2, and then the cleaning robot 72 is spun to let the rib 74 oppose the light generating device 71.

Step S5:

The rib 74 is fixed and the cleaning robot moves straightforward to the light generating device 71 with the help of the rib 74.

Figure 8:
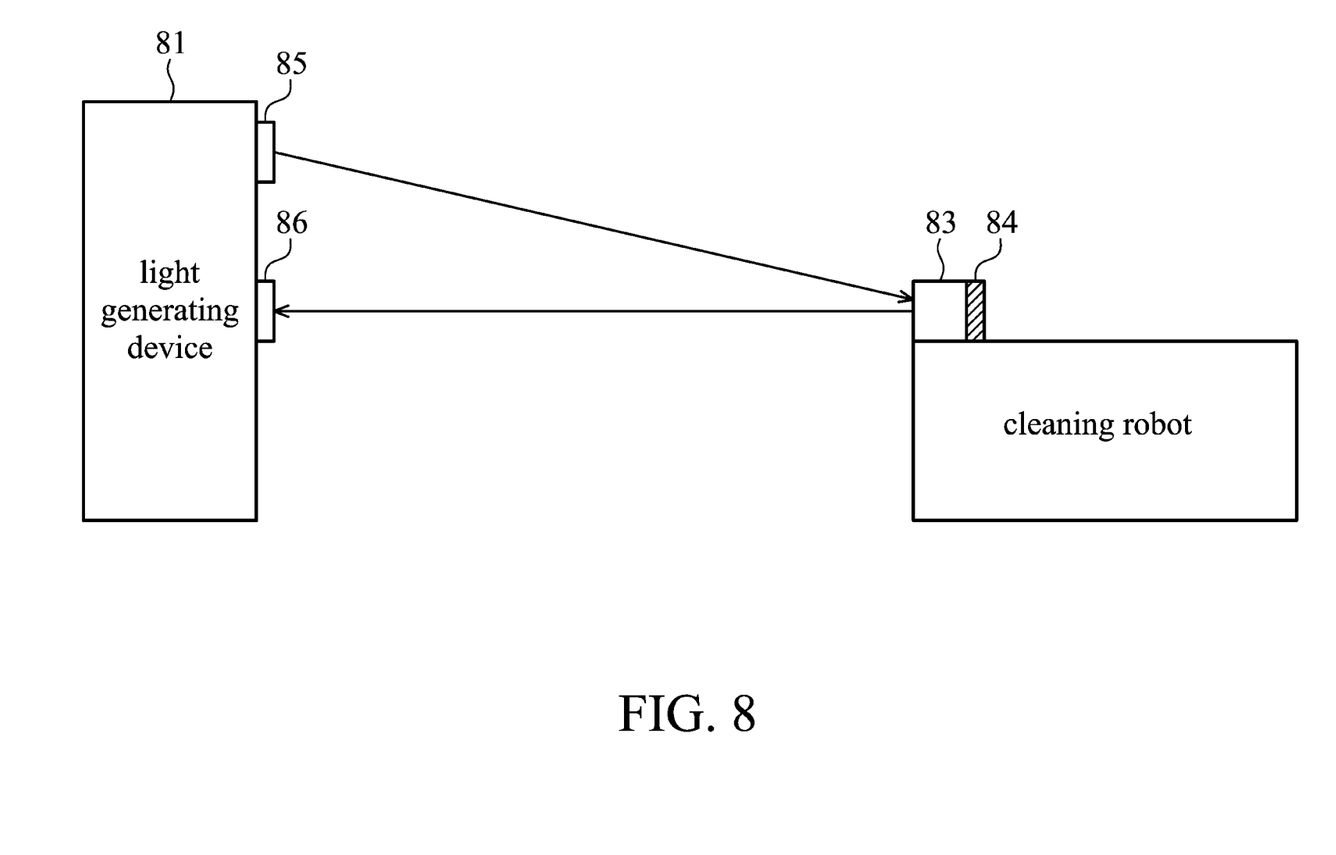
FIG. 8 is a schematic diagram of an embodiment of a cleaning robot according to the invention.

FIG. 8 is a schematic diagram of an embodiment of a cleaning robot according to the invention. The light generating device 81 comprises a wireless signal transmitter 85 and a receiver 86. The wireless signal transmitter 85 outputs a wireless signal to label a restricted area that the cleaning cannot enter.

The cleaning robot comprises a detector 83 and a mask 84. The detector 83 detects of the wireless signal output by the wireless signal transmitter 85. In one embodiment, the detector 83 can reflect the wireless signal to the receiver 86. In another embodiment, the mask 84 reflects of the wireless signal to the receiver 86. Moreover, the cleaning robot further comprises a first wireless signal transmitter to output a first wireless signal, wherein the first wireless signal and the wireless signal output by the wireless signal transmitter 85 have the same encoding format or modulation format.

When the receiver 86 receives the wireless signal, a control device embedded in the light generating device 81 decodes or demodulates the received wireless signal. When the control device confirms that the received wireless signal has the same coding format or modulation format as the wireless signal output by the light generating device 81, the control device determines that the cleaning robot is approaching to the light generating device 81. The control device can determine the distance between the light generating device 81 and the cleaning robot according to the strength of the received signal.

Figure 9:
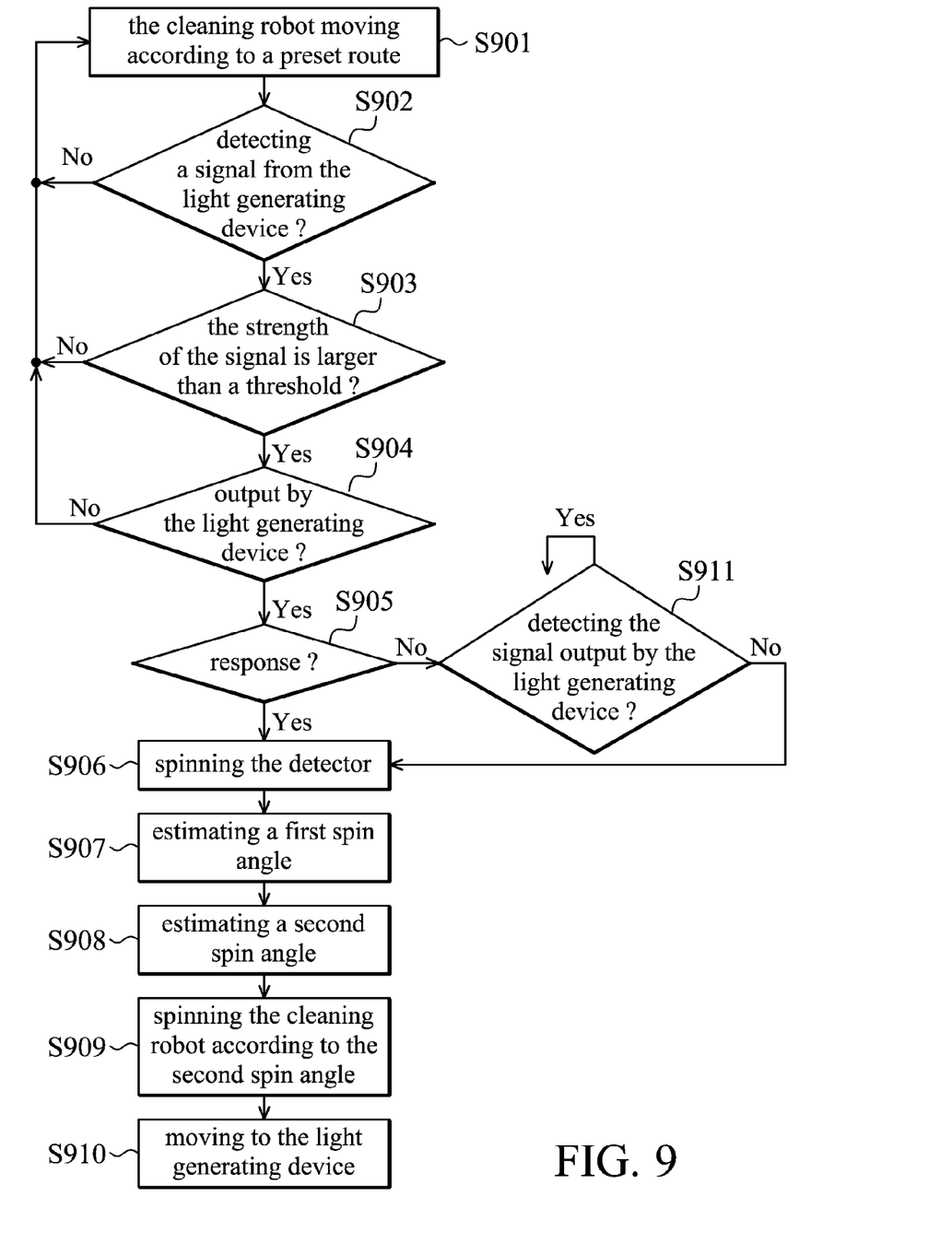
FIG. 9 is a flowchart of a cleaning robot control method according to another embodiment of the invention.

FIG. 9 is a flowchart of a cleaning robot control method according to another embodiment of the invention. In step S901, the cleaning robot moves according to a preset route. Typically, the cleaning robot moves in a random mode or an initial moving mode set by the user when the cleaning robot starts working. When the cleaning robot moves in the random mode, a controller of the cleaning robot starts drawing an indoor plane map. Next time when the cleaning robot executes a cleaning job, the cleaning robot moves according to the indoor plane map to increase efficiency.

In step S902, a detector determines whether a wireless signal from the light generating device is detected. If not, the cleaning robot moves according to the original route. If the detector detects of the wireless signal from the light generating device, step S903 is then executed.

In step S903, a controller of the cleaning robot first determines whether the strength of the received wireless signal is larger than a predetermined value. If yes, the step S904 is executed. If the strength of the received wireless signal is not larger than the predetermined value, the wireless signal detected by the detector is regarded as noise interference, and step S901 is then executed. If the strength of the received wireless signal is larger than the predetermined value, the controller determines a distance between the cleaning robot and the transmitting source outputs the wireless signal according to the strength of the wireless signal.

In step S904, the controller determines whether the received wireless signal is output by the light generating device. If not, the step S901 is then executed. If the received wireless signal is output by the light generating device, the step S905 is executed.

In one embodiment, the detector is a non-omnidirectional light detector. The wireless signal emitted by the light generating device is a light beam carrying encoded information or modulated information. When the detector detects the light beam, the detected beam is decoded or demodulated to confirm whether the light beam is emitted by the light generating device.

In another embodiment, the detector is an acoustic signal detector and has an acoustic panel. The wireless signal output by the light generating device is an acoustic signal carrying encoded or modulated information. When the detector detects the acoustic signal, the acoustic signal or the information carried by the acoustic signal is decoded or demodulated to determine whether the acoustic signal is output by the light generating device.

The acoustic panel reflects the received acoustic signal to the light generating device. When the light generating device receives the reflected acoustic signal, the light generating device first determines whether the acoustic signal is output by the light generating device. If yes, the light generating device knows that the cleaning robot is approaching to the light generating device and the light generating device determines the position of the cleaning robot according to the strength of the received acoustic signal.

In step S905, the controller of the cleaning robot determines whether to respond to the event that the detector detects of the wireless signal output by the light generating device. For example, the cleaning robot leaves the area that is covered by the wireless signal. If the controller decides to respond, step S906 is executed. If the controller decides not to respond, step S911 is executed and the cleaning robot keeps moving.

In step S911, the controller of the cleaning robot continuous to determine whether the detector of the cleaning robot is still detecting the wireless signal output by the light generating device. If yes, the cleaning robot keeps moving and the step S911 is still executed. When the detector of the cleaning robot does not detect the wireless signal output by the light generating device, step S906 is executed. In the step S911, the situation where the detector of the cleaning robot does not detect the wireless signal output by the light generating device represents that the cleaning robot may enter the restricted area and the cleaning robot has to leave as soon as possible.

In the step S906, when the detector detects the wireless signal output by the light generating device, the detector transmits a first trigger signal to the controller and the controller determines to execute the step S906 or step S911 according to the setting of the cleaning robot and the first trigger signal. In one embodiment, the first trigger signal is transmitted to a GPIO (general purpose input/output pin) and the logic state of the GPIO pin is changed accordingly. For example, assuming the first trigger signal is a rising edge-triggered signal and the default logic state of the GPIO pin is a logic low state, the logic state of the GPIO pin is changed to a logic high state when receiving the rising edge-triggered signal. The change of the logic state of the GPIO pin triggers an interrupt event and the controller of the cleaning robot knows that the detector has detected the wireless signal output from the virtual according to the interrupt event.

In step S906, the cleaning robot stops moving and the detector is spun in a clockwise direction or a counter clockwise direction. Reference can be made to the descriptions related to FIGS. 2a-2e for the light detector and the structure and the operation of the light detector. If the detector is an acoustic detector, the acoustic detector is spun and when the acoustic detector detects a maximum strength of the acoustic signal, it indicates that the acoustic detector is opposite to the light generating device and the acoustic detector stops spinning.

In step S907, in one embodiment, assuming that the wireless signal is a light beam, when the detector does not detect the wireless signal output by the light generating device, the controller of the cleaning robot estimates a first spin angle. In another embodiment, assuming that the wireless signal is an acoustic signal, when the acoustic detector detects the maximum strength of the acoustic signal, the controller of the cleaning robot estimates a first spin angle.

Then, in step S908, the controller of the cleaning robot estimates a second spin angle according to the first spin angle, a first center of the detector, a second center of the cleaning robot and a distance between the first center and the second center. Then, the cleaning robot is spun according to the second spin angle (step S909). By this way, it can be sure that the cleaning robot moves straightforward to the light generating device.

In another embodiment, the controller of the cleaning robot acquires a first coordinate of the first center and a second coordinate of the second center to estimate a relative angle between the first center and the second center. Then, the controller estimates the second spin angle according to the first spin angle and the relative angle. The cleaning robot then spins for the second spin angle. After spinning, the front of the cleaning robot opposes to the light generating device. When the cleaning robot moves straightforward, the cleaning robot is therefore approaching to the light generating device and does not need to calibrate the moving direction during the movement.

In another embodiment, the cleaning robot and the detection spin simultaneously. Assuming, in one embodiment, the wireless signal is a light beam, when the detector does not detect the wireless signal output by the light generating device, the cleaning robot stops spinning. In another embodiment, assuming that the wireless signal is an acoustic signal, when the acoustic detector detects the maximum strength of the acoustic signal, the cleaning robot stops spinning. Then, in step S910, the cleaning robot moves to the light generating device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method of a cleaning robot with a non-omnidirectional light detector, comprising:
   detecting a light beam via the non-omnidirectional light detector;
   stopping the cleaning robot and spinning the non-omnidirectional light detector when the non-omnidirectional light detector detects the light beam;
   stopping the spinning of the non-omnidirectional light detector and estimating a first spin angle, by a processor, when the non-omnidirectional light detector does not detect the light beam; and
   adjusting a moving direction of the cleaning robot according to the first spin angle.

2. The method as claimed in claim 1, further comprising:
   determining whether the light beam is output by a light generating device.

3. The method as claimed in claim 1, further comprising:
   estimating a second spin angle according to the first spin angle, a first center of the non-omnidirectional light detector, a second center of the cleaning robot and a distance between the first center and the second center.

4. The method as claimed in claim 3, further comprising:
   changing the moving direction by spinning the cleaning robot according to the second spin angle.

5. The method as claimed in claim 1, further comprising:
   moving the cleaning robot to a light generating device along the light beam.

6. The method as claimed in claim 5, wherein when the cleaning robot moves along the light beam, the non-omnidirectional light detector cannot detect the light beam.

7. The method as claimed in claim 5, wherein when the non-omnidirectional light detector detects the light when moving to the light generating device along the light beam, the cleaning robot stops and adjusts the moving direction.

8. A control method for a cleaning robot with a non-omnidirectional light detector, comprising:
   detecting a light beam via the non-omnidirectional light detector;
   when the non-omnidirectional light detector detects a light beam at a first time, continuing the movement of the cleaning robot;
   stopping the cleaning robot and spinning the non-omnidirectional light detector when the non-omnidirectional light detector does not detect the light beam;
   stopping the spinning of the non-omnidirectional light detector and estimating a first spin angle, by a processor, when the non-omnidirectional light detector detects the light beam again; and
   adjusting a moving direction of the cleaning robot according to the first spin angle.

9. The method as claimed in claim 8, further comprising:
   determining whether the light beam is output by a light generating device when detecting the light beam.

10. The method as claimed in claim 8, further comprising:
    estimating a second spin angle according to the first spin angle, a first center of the non-omnidirectional light detector, a second center of the cleaning robot and a distance between the first center and the second center.

11. The method as claimed in claim 10, further comprising:
changing the moving direction by spinning the cleaning robot according to the second spin angle.

12. The method as claimed in claim 8, further comprising:
moving the cleaning robot to a light generating device along the light beam.

13. The method as claimed in claim 12, wherein when the cleaning robot moves along the light beam, the non-omnidirectional light detector cannot detect the light beam.

14. The method as claimed in claim 12, wherein when the non-omnidirectional light detector detects the light when moving to the light generating device along the light beam, the cleaning robot stops and adjusts the moving direction.

15. A cleaning robot, comprising:
a wireless signal detector to detect a first wireless signal;
a motor to move the cleaning robot; and
a controller to control the motor according to the first wireless signal, wherein when the wireless signal detector detects the first wireless signal and a strength of the first wireless signal is greater than a predetermined value, the controller determines whether the first wireless signal is output by a light generating device, and when the first wireless signal is output by a light generating device, the controller controls the wireless signal detector and the motor to let the cleaning robot move to the light generating device.

16. The cleaning robot as claimed in claim 15, further comprising a wireless signal transmitter to transmit a second wireless signal to the light generating device.

17. The cleaning robot as claimed in claim 16, wherein the wireless signal transmitter is a wireless signal reflection device to reflect the first wireless signal to the light generating device.

18. The cleaning robot as claimed in claim 15, wherein the wireless signal detector is a non-omnidirectional light detector with a mask, and the first wireless signal is a light beam.

19. The cleaning robot as claimed in claim 18, wherein when the non-omnidirectional light detector detects the light beam, the non-omnidirectional light detector is spun to detect a direction of the light generating device.

20. The cleaning robot as claimed in claim 15, further comprising a wireless device to establish a wireless connection to the light generating device, wherein when the wireless connection is established, the light generating device connects to a network.

* * * * *